United States Patent Office

3,697,355
Patented Oct. 10, 1972

3,697,355
UREA-ALDEHYDE RESIN ADHESIVE PROCESS
William Raymond Black, Springfield, Oreg., assignor to The Borden Company, New York, N.Y.
No Drawing. Filed Feb. 6, 1969, Ser. No. 797,253
Int. Cl. C09j 3/16
U.S. Cl. 156—319  2 Claims

ABSTRACT OF THE DISCLOSURE

This invention relates to the method of bonding water-pentrable cellulosic substrates with urea-aldehyde resin adhesives as illustrated by bonding of wood flakes into particle boards, and in particular to a method of improving the efficiency of said adhesives, which comprises replacing from about 1% up to about 35% by weight of the resin solids by a salt selected from the group consisting of alkali and alkaline earth halides and mixtures thereof; and to the resultant products.

BACKGROUND OF THE INVENTION

In bonding water-penetrable cellulosic particles such as wood chips with adhesives comprising urea-aldehyde resins, there is an urgent need for improving adhesive efficiency. The industrial success of particle board manufacture, for example, depends largely on achieving high levels of bond strength at relatively low cost. Toward this end, it is therefore desirable to exploit the availability of cheaper wood-waste material such as plywood trim. But the inclusion of waste material in the wood furnish often tends to impair the uniformity of bond strength and to lower the average strength when conventional amounts of urea-aldehyde adhesive are used. While strength may be improved by increasing the amount of resin applied, this defeats the purpose of economy.

Even as regards the higher grades of particle board manufactured from specially selected wood furnish carefully engineered as to particle size and shape of wood chips or flakes, there is a growing demand for products with still further increased strength to meet new use requirements. When these requirements are met by using increased amounts of resin adhesive, the costs again tend to become prohibitive.

Bond strength may be increased somewhat by bonding at higher temperature and pressure but the resultant improvement is not sufficient to permit including plywood trim or high levels of many other waste materials in the furnish.

SUMMARY OF THE INVENTION

A process has now been found whereby urea-aldehyde resin adhesives are capable of bonding water-penetrable cellulosic substrates with lower amounts of resin solids into products, such as particle board, without impairment of strength.

In brief, the present invention comprises replacing from about 1% up to about 35% by weight of the resin solids normally applied in bonding water-penetrable cellulosic substrates by a salt selected from the group consisting of alkali and alkaline earth halides and mixtures thereof. The invention also includes urea-aldehyde adhesives comprising the replacing salts and also includes the resultant products.

In addition to the advantage that suitable choice of the replacing salt may effect substantial savings in material costs without loss of adhesive strength, it has been surprisingly found that tensile strength in many cases is substantially increased at the same level of total solids add-on and without changing the temperature and pressure of curing. It has furthermore been found that high and uniform strength may be obtained even when the wood furnish comprises up to 50% by weight of waste material such as plywood trim.

DETAILED DESCRIPTION

The substrate material to be bonded in carrying out the instant invention may be derived from any wood that is porous to the extent of being penetrable by flowable aqueous solutions and identified herein as cellulosic, a term intended to include lignocellulosic. While the advantages of the instant invention are illustrated herein with particular respect to the manufacture of particle board, the modified adhesives of the invention may also be used to advantage in the gluing of wood in laminar form, such as in laminating wood ply to particle board or to other wood ply.

Substrate material may thus be derived from pine, fir, hemlock, spruce, beech, lime, poplar, ash, chestnut, kimba, gaboon, or other trees. When these are used in the manufacture of particle board they are comminuted into the form of particles such as chips or flakes. The starting material for such comminution may be whole wood or may include peeler cores, veneer residues, plywood trim, slats, edgings and the like and may also include minor amounts of non-woody cellulosic materials such as bagasse, flax shives, bamboo or straw. In addition to the cellulosic particles there may also be included a minor proportion of porous plastics of compression-resistant properties such as small beads comprising an expandable or expanded styrene copolymer.

The urea-aldehyde resin for use in the bonding may for example be any acid-curable condensation product of formaldehyde with urea in mole ratio corresponding to 1–2 moles formaldehyde to 1 mole urea. All or part of the formaldehyde may be replaced by other aldehyde such as acetaldehyde, propionaldehyde or furfural. About 5%–50% by weight of the urea may be replaced by melamine.

A typical resin adhesive according to the instant invention is made by charging 53 parts of 50% aqueous formaldehyde solution and 23 parts of urea to a reaction kettle. The solution is first neutralized to a pH of 7.0–8.0 then heated to reflux temperature and refluxed for 20–60 minutes. After acidification to pH 5.0–6.5, condensation is continued until a Gardner bubble tube reads between A and C. At this point pH is brought to 7.0 then 12 parts of urea are charged and the clear solution cooled to 20–50° C.

In adjusting pH during the manufacture of the resin adhesive, any appropriate acid or base may be used, as for example formic acid and sodium hydroxide respectively.

To convert the urea-formaldehyde resin thus obtained to a modified adhesive according to this invention, there is then charged to the kettle a halide salt in solid, solution or slurry form, as for example a solution of 8 parts of lithium chloride in 4 parts water. Agitation is continued until a clear solution is obtained which is then cooled for storage. Typical batches of material made in this way have viscosity between 200–400 cps., pH between 6.8–7.5 and solids between 66–68% by weight.

The halide salt of this invention may be any soluble halide of an alkali or alkaline earth metal. Because of their present relative cheapness sodium chloride and magnesium chloride are currently preferred, but salts which function according to this invention include, for example, potassium chloride, lithium chloride, sodium bromide, potassium iodide, magnesium bromide, calcium chloride, strontium chloride and barium chloride.

The salt of this invention may be first mixed with the urea-aldehyde resin, as above illustrated, and applied simultaneously with the resin to the material to be bonded. Alternatively, an aqueous solution of the salt may be separately applied to the substrate either before or after the resin. Thus, for example, the salt may be incorporated in a wax dispersion applied to impart water resistance.

In addition to the urea-aldehyde resin and the salt of this invention, the usual substances may be added to the adhesive in the requisite minor quantities for the purpose of accelerating cure of the resin or for the purpose of imparting certain properties on the finished product such as water resistance, fire retardance, or resistance to mold and fungi. As to accelerators for the curing of the resin, these could be any suitable acid or acid donor such as are commonly used with urea-aldehyde resins, and include formic acid, ammonium chloride, ammonium sulfate and zinc chloride. Western soft woods commonly contain a sufficient level of acidic material in nature to make the addition of such accelerators unnecessary in their case.

The simultaneous or stepwise application of the various aforementioned additives, including the resin and the halide salt of this invention, may be carried out in either batch-wise or continuous manner using machinery well established in the relevant manufacturing arts, special care being taken to effect homogeneous distribution of all said additives.

As to amounts, the total of additive solids including urea-aldehyde resin and halide salt is usually in the range of from 3–15 parts per 100 substrate material. The preferred amount is to be determined by the necessity for balancing cost against specific efficiency and is usually in the range of about 5–7 parts per 100 of substrate material. Some of the advantages of using the salt of this invention, particularly from the standpoint of savings in cost, may be obtained when as little as 1% by weight of the resin solids is replaced by halide salt. The minimum amount required to obtain substantial increase in bond strength is dependent on the nature of the substrate material and may be approximately about 2%–3%. As the proportion of halide salt is increased incrementally above this threshold, bond strength is correspondingly increased over a range that is specific to the particular substrate, eventually reaching a maximum level of bond strength. While further increases in proportion of halide salt do not further enhance the strength, up to about 35% replacement of resin solids by salt may often be used satisfactorily without adversely affecting the properties of the bonded product.

After the modified adhesive and any other additives as aforementioned have been distributed between the juxtaposed surfaces to be bonded, the bonding is effected by curing of the resin at elevated temperature and pressure, these conditions being kept sufficiently mild to avoid degradation of the particular substrate material. In the case of particle board the substrate particles are first consolidated by pressing into desired shape. The conditions chosen for curing of the resin will depend on parameters familiar to those skilled in the art, including the nature of heat exchange which among other factors depends on the density and thickness of the assembly to be bonded. Commonly used conditions fall within the ranges 280°–425° F. (platen temperatures), 50–800 p.s.i. and 2–20 minutes curing time, but the advantages of the instant invention could conceivably be attained under conditions other than these.

As to plywood, an aqueous adhesive solution is applied between plies so as to deposit about 15 to 30 pounds of solids per 1000 square feet of wood, the solids including urea-formaldehyde resin and a salt selected from alkali and alkaline earth halides. Amount of the salt is from 2 to about 35%, based on the combined weight of the resin and salt. The temperature to which the plywood assembly is heated in order to cure the bond is 220 to 300° F. and for a duration of 4 to 20 minutes.

The mechanism through which this invention is operative is not completely understood. It appears not to be connected with any catalysis of curing inasmuch as the augmented strength is obtainable with inert salts such as sodium chloride, potassium bromide and lithium chloride which are known to be without catalytic effect on the curing of urea-aldehyde resins.

In the examples that follow and elsewhere herein, proportions are expressed as parts by weight unless specifically stated to the contrary.

It is well-known to those skilled in the art that moisture contained in the wood has a vital role in bonding of wood by urea-aldehyde resins and the level of water content should be closely controlled. While amounts of add-on are given in the following examples on the basis of oven-dried wood, the substrate chips which were treated as described in the examples below contained between 3% and 6% moisture. In comparison tests, aliquots of substrate were used having the same water content. To obtain optimum performance with any particular blend of wood furnish, it is common practice to study the effect of water content on adhesive efficiency over a range of moisture levels to determine the preferred level.

EXAMPLE 1

A furnish of 75% ponderosa pine and 25% Douglas fir was reduced to particles in a Bauer attrition mill. A furnish of 100% white fir was reduced to chips in a Pallmann pulverizer. A 50–50 blend of these two furnishes was used in the experiments of Examples 1, 2, 3 and 4. An aliquot of these flakes was treated with a catalyzed urea-formaldehyde resin (Casco Resin WS–114–79) in amount corresponding to 6 parts by weight resin solids per 100 parts oven-dry wood, using a horizontal rotating drum-type blender with internally mounted spray system. There was then likewise added 0.5 part of a paraffin wax emulsion, care being taken to attain maximum homogeneity. Square samples of board of dimension 14.5" x 14.5" and 0.838" in thickness were preformed by mat consolidation at a pressure of 250 p.s.i. prior to the final pressing and curing at 310° F. for 5 minutes. During this pressing cycle the pressure varied from about 650 p.s.i. down to about 50 p.s.i. This example illustrates a treatment not including the halide of this invention and tests on the product thereof are included for comparison in Table I together with corresponding data on the products of the following Examples 2, 3 and 4.

EXAMPLE 2

The procedure of Example 1 was followed except that 3 parts by weight sodium chloride (NaCl) were added to 100 parts of liquid Casco Resin WS–114–79 and this mixture was used to treat the wood flakes in amount corresponding to 6 parts by weight total solids per 100 parts of oven-dry wood. Since the solids content of Casco Resin WS–114–79 was 60%, this treatment differed from Example 1 in that 4.8% of the resin solids were replaced by sodium chloride.

EXAMPLE 3

The procedure of Example 1 was followed except that 6 parts by weight sodium chloride were added to 100 parts of liquid Casco Resin WS–114–79 and this mixture was used to treat the wood flakes in amount corresponding to 6 parts by weight total solids per 100 parts of oven-dry wood. This treatment differed from Example 1 in that 9% of the resin solids were replaced by sodium chloride.

EXAMPLE 4

The procedure of Example 1 was followed except that 3 parts by weight magnesium chloride ($MgCl_2$) were added to 100 parts of liquid Casco Resin WS–114–79 and this mixture was used to treat the wood flakes in amount corresponding to 6 parts by weight total solids per 100 parts of oven-dry wood. Since the solids content of Casco Resin WS–114–79 was 60%, this treatment differed from Example 1 in that 4.8% of the resin solids were replaced by magnesium chloride.

Test results on the particle board products of Examples 1 through 4 are summarized in Table I. These results show significant improvement in the internal board strength achieved by the incorporation of the respective alkali halides in place of part of the resin solids.

TABLE I

Effect of alkali halides on UF Resin Efficiency using Casco Resin WS–114–79 (60% solids) and wood chip blend containing 37.5% ponderosa pine, 12.5% Douglas fir and 50% white fir. Al ltreatments at 6% total solids on basis of oven-dried wood weight.

|  | Example | | | |
|---|---|---|---|---|
|  | 1 | 2 | 3 | 4 |
| Alkali halide | None | NaCl | NaCl | MgCl₂ |
| Parts by weight of UF Resin solids replaced | | 3% | 6% | 3% |
| Thickness (inches) | .838 | .827 | .820 | .827 |
| Density (lbs./cu. ft.) | 41.5 | 42.2 | 42.4 | 42.3 |
| Internal bond (p.s.i.) | 78 | 126 | 142 | 95 |

EXAMPLE 5

A furnish of 100% white fir was reduced to chips in a Pallmann pulverizer. Using the blender and spray procedure of Example 1, aliquots of the pulverized furnish were treated with the respective compositions given in Table II in amounts corresponding to 6% total solids based on the weight of oven-dried wood, Casco WS– based on the weight of oven-dried wood, Casco WS–138–43 being a non-catalyzed urea-formaldehyde resin of commerce and containing 68% solids. Boards having the stated thickness and density were prepared by pressing at 330° F. for 5 minutes at 50–650 p.s.i. The test results of the table show that the use of the method of this invention as exemplified in Experiment C in which 8.1% of the resin solids were replaced by sodium chloride resulted in superior modulus of rupture. Furthermore, although the treatment of Experiment C did not include addition of conventional ammonium sulfate catalyst, the products were comparable in regard to both internal strength and water absorption.

TABLE II

Effect on adhesive efficiency of UF Resin when 6% sodium chloride (based on liquid resin) is used instead of catalyst in amount of ammonium sulfate.

|  | Experiment | | |
|---|---|---|---|
|  | A | B | C |
| (NH₄)₂SO₄ based on o.d. wood weight | .25% | .5% | None |
| NaCl based on liquid resin | None | None | 6% |
| Board thickness (inches) | .814 | .808 | .814 |
| Density (lbs./cu. ft.) | 40.1 | 40.5 | 40.6 |
| Internal bond strength (p.s.i.) | 92 | 122 | 116 |
| Modulus of rupture | 2,260 | 2,346 | 2,466 |

EXAMPLES 6, 7 AND 8

A furnish composed entirely of ponderosa pine was reduced to flakes and aliquots were treated respectively as indicated in Table III. The procedure was essentially that of Example 1, excepting that the UF resin used was Casco Resin WS–138–44 containing 65% solids and the combined resin and halide solids applied on an oven-dry basis was 5.5%. A paraffin wax emulsion was applied at 0.5% level on oven-dry basis. Treatment was carried out in rotating drum blender equipped with internal spray. Particle board samples were pressed for 4.5 minutes at 325° F. and under 50–650 p.s.i. Example 6 was a control sample prepared without any alkali halide. Examples 7 and 8 illustrate the instant invention and differed from each other in that the sodium chloride in Example 7 was first mixed with the resin before spraying, whereas in Example 8 an aqueous solution of sodium chloride was first sprayed on the furnish, the furnish was then redried to the initial mixture content and the resin was then applied.

The results of corresponding tests, as summarized in Table III show that internal bond strength was substantially increased by the replacement of 8.25% of resin solids by sodium chloride both when the sodium chloride was applied simultaneously with the resin and also when the resin and sodium chloride were applied separately.

TABLE III

Effect of mode of addition of sodium chloride on adhesive efficiency of a UF Resin

|  | Example | | |
|---|---|---|---|
|  | 6 | 7 | 8 |
| Procedure | No NaCl | NaCl added with resin | NaCl added separately |
| Board thickness (inches) | .825 | .814 | .820 |
| Density (lbs./cu. ft.) | 42.4 | 42.9 | 42.6 |
| Water absorption (percent) | 12.6 | 12.4 | 12.3 |
| Internal bond (p.s.i.) | 93 | 158 | 150 |

EXAMPLE 9

Mixtures were prepared of 100 grams of Casco Resin WS–138–44 with 0.10 mole respectively of sodium chloride (NaCl), sodium bromide (NaBr), potassium chloride (KCl), potassium iodide (KI) and lithium chloride (LiCl). The mixture with sodium chloride was in the same proportions by weight as in Example 7. Treatments of 100% pine chips were made according to the procedure of Example 7, the combined resin and halide solids amounting to 5.5% on dry-wood basis, and the paraffin wax solids amounting to 0.5% on the same basis. Boards were pressed for 4.5 minutes at 325° F. and 50–650 p.s.i. The test results summarized in Table IV further illustrate the advantages of the instant invention. In all cases substantial increases were achieved in internal bond strength and rupture modulus.

TABLE IV

Comparison of various alkali halides at level 0.10 mole per 100 grams UF Resin

| Alkali halide | None | NaCl | NaBr | KCl | KI | LiCl |
|---|---|---|---|---|---|---|
| Board thickness (inches) | .814 | .802 | .810 | .804 | .805 | .832 |
| Density (lbs./cu. ft.) | 42.2 | 42.6 | 42.0 | 42.7 | 42.2 | 40.9 |
| Internal bond (p.s.i.) | 55 | 124 | 137 | 138 | 142 | 138 |
| Modulus of rupture (p.s.i.) | 1,711 | 1,877 | 1,850 | 1,963 | 1,888 | 1,744 |
| Water absorption (percent) | 16.6 | 16.9 | 26.2 | 15.5 | 21.2 | 9.1 |

EXAMPLE 10

The effect of several levels of sodium chloride in the use of the instant invention is illustrated in Table V. The furnish was 100% pine, the sodium chloride was applied as a separate water solution to the chips which were then redried to the same moisture content as the control furnish before resin application. The procedure of Example 8 was followed, pressing at 325° F. for 4.5 minutes under 50–650 p.s.i.

TABLE V

Improvement in adhesive efficiency of UF Resin as several levels of sodium chloride

| Sodium chloride levels based on liquid resin | 0 | 1% | 10% | 20% | 30% |
|---|---|---|---|---|---|
| Board thickness (inches) | .823 | .845 | .817 | .817 | .817 |
| Density (lb./cu. ft.) | 41.5 | 40.6 | 41.8 | 41.8 | 41.8 |
| Internal bond (p.s.i.) | 98 | 109 | 150 | 156 | 149 |
| Water absorption (percent) | 10.6 | 12.7 | 14.2 | 16.8 | 18.6 |

EXAMPLE 11

A furnish was prepared from 80 parts planer shavings, containing Douglas fir and hemlock in the proportion of about 73/27, and 20 parts of trim from 100% Douglas fir protein-bonded plywood. Treatments of this furnish were made with UF Resin, Casco Resin WS–138–44 and modifications as summarized in Table VI. Application was carried out as described in Example 1. Amounts applied, based on oven-dried wood, were 6% of combined resin and halide solids, and 0.5% of paraffin wax solids. Pressing was for 4 minutes at 320° F.

The tests reported in Table VI demonstrate substantial improvement in internal bond strength and modulus of rupture without seriously impairing water absorption.

TABLE VI

Effect of alkali halide replacement on adhesive efficiency of UF Resin applied to furnish containing 20% plywood trim

| Alkali halide content based on liquid resin | None | 3% NaCl plus 3% $MgCl_2$ | 6% NaCl |
|---|---|---|---|
| Board thickness (inches) | .696 | .691 | .690 |
| Density (lbs./cu. ft.) | 42.3 | 42.7 | 42.6 |
| Internal bond (p.s.i.) | 106 | 132 | 138 |
| Modulus of rupture (p.s.i.) | 2,644 | 2,870 | 2,880 |
| Water absorption (percent) | 23.1 | 23.2 | 20.8 |

EXAMPLE 12

A furnish was prepared from 70 parts of Bauer refine ponderosa pine-Douglas fir (75/25) planer shavings and 30 parts hammermilled plywood trim. The trim was from pine faced-white fir core production plywood bonded with an exterior phenolic adhesive. This furnish was treated with Casco Resin WS–114–79 and a modification as summarized in the table below. Application was as described in Example 1. Amounts applied, based on oven-dry wood, were 6% of combined resin and halide solids and 0.5% of paraffin wax solids. Pressing was for 4 minutes at 320° F.

The tests reported in Table VII demonstrate substantial improvement in bond strength and water-absorption properties.

TABLE VII

Effect of $MgCl_2$ addition on adhesive efficiency of resin applied to furnish containing 30% plywood trim

| $MgCl_2$ content based on liquid resin | None | 3% $MgCl_2$ |
|---|---|---|
| Board thickness (inches) | .817 | .808 |
| Density (lbs./cu. ft.) | 43.2 | 44.2 |
| Internal bond (p.s.i.) | 87 | 136 |
| Water absorption (percent) | 16.1 | 13.5 |
| Percent swelling in thickness after water soak | 6.14 | 5.68 |

EXAMPLE 13

A urea aldehyde resin is prepared in the following steps:

(a) A reactor vessel is charged with 25 parts of 50% aqueous formaldehyde, 20.5 parts acetaldehyde and 23 parts urea.

(b) The pH is adjusted to 7.0–8.0 and the mixture is heated to reflux for one hour.

(c) The pH is adjusted to 6.0 and condensation is continued until Gardner Bubble Tube reading is B.

(d) After adjustment of pH to 7.0, there is added 12 parts of urea and the mixture is cooled to 30° C.

(e) One-half of the product of step (d) is mixed with 6 parts of a 66.7% slurry of sodium chloride in water.

EXAMPLE 14

In a series of corresponding prepartions, the procedure of Example 13 is followed excepting that the acetaldehyde is replaced by equimolar amounts of respectively propionaldehyde, butyraldehyde and furfural.

EXAMPLE 15

The procedure of Example 13 is followed excepting that 50% of each addition of urea is replaced by melamine.

The various urea aldehyde resins corresponding to the products of steps (d) and (e) respectively of Examples 13, 14 and 15 are used to treat pine chips according to the procedure of Example 1. The solids add-on in all cases is 6% on basis of oven-dry wood, and the curing conditions are identical throughout. The internal bond strength of each particle board is measured and it is found that each sample prepared with a product of step (e) has a significantly higher strength than the corresponding sample prepared with the control (d).

EXAMPLE 17

A plywood adhesive is prepared by mixing with 225 lbs. water at 55° F., 165 lbs. of urea formaldehyde resin Casco Resin 91, 188 lbs. of wheat flour, 9 lbs. soluble blood and 2 lbs. of an anti-foaming agent, Defoamer AF–31. A modification of this adhesive also is prepared wherein 5% of the urea-formaldehyde resin solids are replaced by sodium chloride.

These adhesives are used respectively to construct plywood panels on a laboratory scale, assembling five inner plies of ⅐ inch white fir veneers dried to 3% moisture content and two-face plies of 1/24 inch birch veneers dried to 8% moisture content. In each case both sides of three of the inner plies are treated with 34.5 lbs. per 1000 sq. ft. of the same adhesive. The assembled panel is prepressed at 175 p.s.i. and then hot-pressed at 175 p.s.i. for 5.5 minutes at 260° F. Total assembly time is 45 minutes.

Both adhesives are equally effective in producing suitable panels with the adhesive of the instant invention having the commercial advantage of being much less costly.

It will be understood that it is intended to cover all changes and modifications of the examples of the invention herein chosen for the purpose of illustration which do not constitute departures from the spirit and scope of the invention.

What is claimed is:

1. A process for bonding water-penetrable cellulosic substrates with a urea-aldehyde resin adhesive aqueous solution which comprises:

(A) applying to each substrate a water-dispersible salt selected from the group consisting of an alkali halide, alkaline earth halide and mixtures thereof dissolved in water;

(B) applying to at least one of said substrates an aqueous adhesive solution of a urea-aldehyde resin;

(C) bringing the salted surfaces of said substrates in contact with each other wherein the quantity of salt and resin solids are from about 15 to 30 pounds per 100 square feet of substrate;

(D) under pressure heating said substrates between platens maintained at about 220° F. to 300° F. for about 4 to 20 minutes to cure the resin.

2. A process of claim 1 wherein the salt is sodium chloride.

References Cited

UNITED STATES PATENTS

| 2,175,475 | 10/1939 | Ludwig | 260—29.4 R |
| 3,100,754 | 8/1963 | Booth et al. | 260—29.4 R |
| 3,137,607 | 6/1964 | Goldstein et al. | 156—319 |
| 3,335,113 | 8/1967 | Dundon | 260—29.4 R |
| 2,772,197 | 11/1956 | Kozdemba | 156—331 |
| 3,006,879 | 10/1961 | Ryan et al. | 156—331 XR |
| 3,450,659 | 6/1969 | Bondi et al. | 260—29.4 |

CARL D. QUARFORTH, Primary Examiner

E. A. MILLER, Assistant Examiner

U.S. Cl. X.R.

156—331, 335